United States Patent
Kimura (10) Patent No.: US 9,308,495 B2
(45) Date of Patent: Apr. 12, 2016

(54) EXHAUST PURIFIER

(71) Applicant: HINO MOTORS, LTD., Hino-shi (JP)

(72) Inventor: Masahiro Kimura, Hino (JP)

(73) Assignee: Hino Motors, Ltd., Hino-shi (JP)

(*) Notice: Subject to any disclaimer, the term of this patent is extended or adjusted under 35 U.S.C. 154(b) by 0 days.

(21) Appl. No.: 14/416,949

(22) PCT Filed: Jul. 11, 2013

(86) PCT No.: PCT/JP2013/069002
§ 371 (c)(1),
(2) Date: Jan. 23, 2015

(87) PCT Pub. No.: WO2014/017310
PCT Pub. Date: Jan. 30, 2014

(65) Prior Publication Data
US 2015/0202569 A1    Jul. 23, 2015

(30) Foreign Application Priority Data

Jul. 25, 2012  (JP) .................................. 2012-164827

(51) Int. Cl.
*F01N 3/28* (2006.01)
*B01D 53/94* (2006.01)
*B01D 53/79* (2006.01)
*F01N 3/20* (2006.01)
(Continued)

(52) U.S. Cl.
CPC ............... *B01D 53/79* (2013.01); *B01D 53/94* (2013.01); *B01D 53/9477* (2013.01); *B01F 3/04049* (2013.01); *B01F 5/0057* (2013.01); *B01F 5/0473* (2013.01); *F01N 3/2066* (2013.01); *F01N 3/2892* (2013.01); *F01N 13/009* (2014.06); *F01N 13/08* (2013.01); *B01D 53/9431* (2013.01); *B01D 2251/2062* (2013.01); *B01F 2005/0091* (2013.01); *F01N 3/035* (2013.01); *Y02T 10/24* (2013.01)

(58) Field of Classification Search
USPC .................................................. 422/148, 176
See application file for complete search history.

(56) References Cited

U.S. PATENT DOCUMENTS

2009/0094964 A1    4/2009  Fujita et al.
2009/0158717 A1    6/2009  Kimura et al.
(Continued)

FOREIGN PATENT DOCUMENTS

EP    2607641 A1    6/2013
GB    2 381 218 A    4/2003
(Continued)

OTHER PUBLICATIONS

International Preliminary Report on Patentability and Written Opinion issued Feb. 5, 2015 in PCT/JP2013/069002.
(Continued)

*Primary Examiner* — Walter D Griffin
*Assistant Examiner* — Jelitza Perez
(74) *Attorney, Agent, or Firm* — Oblon, McClelland, Maier & Neustadt, L.L.P.

(57) ABSTRACT

An exhaust purifier for purifying exhaust gas of an engine includes an injector that injects a reducing agent into a pipe through which exhaust gas flows and a guide member that guides the exhaust gas flowing through the pipe, and the guide member guides the exhaust gas toward one side of an injection area into which the reducing agent is injected, by covering an exhaust gas upstream side of the injection area.

5 Claims, 5 Drawing Sheets

(51) Int. Cl.
   *F01N 13/08*   (2010.01)
   *B01F 5/00*    (2006.01)
   *B01F 5/04*    (2006.01)
   *B01F 3/04*    (2006.01)
   *F01N 13/00*   (2010.01)
   *F01N 3/035*   (2006.01)

(56) References Cited

U.S. PATENT DOCUMENTS

| | | | |
|---|---|---|---|
| 2009/0313979 A1* | 12/2009 | Kowada | 60/297 |
| 2010/0146950 A1* | 6/2010 | Hayashi et al. | 60/301 |
| 2011/0094206 A1* | 4/2011 | Liu | F01N 3/2066 60/274 |
| 2011/0113758 A1 | 5/2011 | Perrot et al. | |
| 2011/0308234 A1* | 12/2011 | De Rudder | B01F 3/04049 60/295 |
| 2012/0144812 A1 | 6/2012 | Hyun | |
| 2012/0324872 A1 | 12/2012 | Jaruvatee et al. | |
| 2015/0020484 A1 | 1/2015 | Kimura | |

FOREIGN PATENT DOCUMENTS

| | | |
|---|---|---|
| JP | 2-223624 A | 9/1990 |
| JP | 2006-329019 A | 12/2006 |
| JP | 2008-215286 A | 9/2008 |
| JP | 2009-97435 A | 5/2009 |
| JP | 2009-103019 A | 5/2009 |
| JP | 2009-150338 A | 7/2009 |
| JP | 2009-156073 A | 7/2009 |
| JP | 2009-228484 A | 10/2009 |
| JP | 2010-84700 A | 4/2010 |
| JP | 2011-99390 A | 5/2011 |
| JP | 2012-122469 A | 6/2012 |
| JP | 2013-7379 A | 1/2013 |
| WO | WO 2008/102560 A1 | 8/2008 |
| WO | WO 2011/148806 A1 | 12/2011 |
| WO | WO 2013/105336 A1 | 7/2013 |

OTHER PUBLICATIONS

International Search Report issued Aug. 6, 2013 in PCT/JP2013/069002.

International Preliminary Report on Patentability and Written Opinion issued Jul. 24, 2014 in PCT/JP2012/079366.

European Search Report issued Aug. 14, 2015 in corresponding European Application No. 12865222.9 (6 pages).

* cited by examiner

EXHAUST PURIFIER

TECHNICAL FIELD

The present invention relates to an exhaust purifier for purifying exhaust gas of an engine.

BACKGROUND ART

As an exhaust purifier for purifying exhaust gas of an engine, an exhaust purifier described in Patent Literature 1 has heretofore been known. The exhaust purifier described in Patent Literature 1 is made by forming a bulging portion on an exhaust pipe from which the exhaust gas is exhausted, and mounting, on the bulging portion, an injector that injects a reducing agent. The exhaust purifier is provided with a pipe member on the exhaust gas upstream side of the bulging portion, and the pipe member is projected from the bulging portion.

CITATION LIST

Patent Literature

[Patent Literature 1] Japanese Patent Application Laid-Open Publication No. 2010-084700

SUMMARY OF INVENTION

Technical Problem

In the exhaust purifier described in Patent Literature 1, the reducing agent is directly injected to the exhaust gas flowing in the exhaust pipe. As a result, diffusion of the reducing agent can be insufficient because, for example, the flow of the exhaust gas makes the reducing agent adhere to the inner wall surface of the exhaust pipe. One aspect of the present invention has been made in view of the above-described circumstances, and it is an object thereof to provide an exhaust purifier that can sufficiently diffuse the reducing agent.

Solution to Problem

According to one aspect of the present invention, an exhaust purifier for purifying exhaust gas of an engine includes an injector that injects a reducing agent into a pipe through which the exhaust gas flows and a guide member that guides the exhaust gas flowing through the pipe, and the guide member guides the exhaust gas toward one side of an injection area of the reducing agent by covering an upstream side of the exhaust gas in the injection area.

With the exhaust purifier according to the above-described aspect of the present invention, the reducing agent can be mixed into the exhaust gas flowing through the pipe by injecting the reducing agent from the injector. At this time, the guide member guides the exhaust gas toward one side of the injection area by covering the exhaust gas upstream side of the injection area, so that the exhaust gas is inhibited from directly entering the injection area of the reducing agent, and a swirl flow surrounding the injection area of the reducing agent can be generated. As a result, it is possible to diffuse the reducing agent injected from the injector in the exhaust gas while inhibiting the reducing agent injected from the injector from adhering to the inner wall surface of the pipe due to wind pressure of the exhaust gas, so that the diffusion of the reducing agent can be sufficiently performed.

In this case, the guide member can include a first guide portion that is formed into a circular arc shape in the cross section sharing a center axis with the injection area and a second guide portion that extends from the first guide portion in a direction departing from the injection area.

The guide member can have one or a plurality of through-holes formed therein. When the through-hole or through-holes is/are formed in the guide member in this manner, most of the exhaust gas flows downstream while wrapping around the injection area, whereas a part of the exhaust gas flows downstream through the through-holes of the guide member.

The injector can inject the reducing agent in a direction inclined with respect to the axis line of the pipe.

Advantageous Effects of Invention

According to one aspect of the present invention, diffusion of a reducing agent can be sufficiently performed.

DESCRIPTION OF EMBODIMENT

Hereinafter, a preferred embodiment of one aspect of the present invention will be described in detail with reference to the drawings. In the following description, the same reference signs will be given to the same or equivalent elements, and duplicate description thereof will be omitted.

Figure 1:
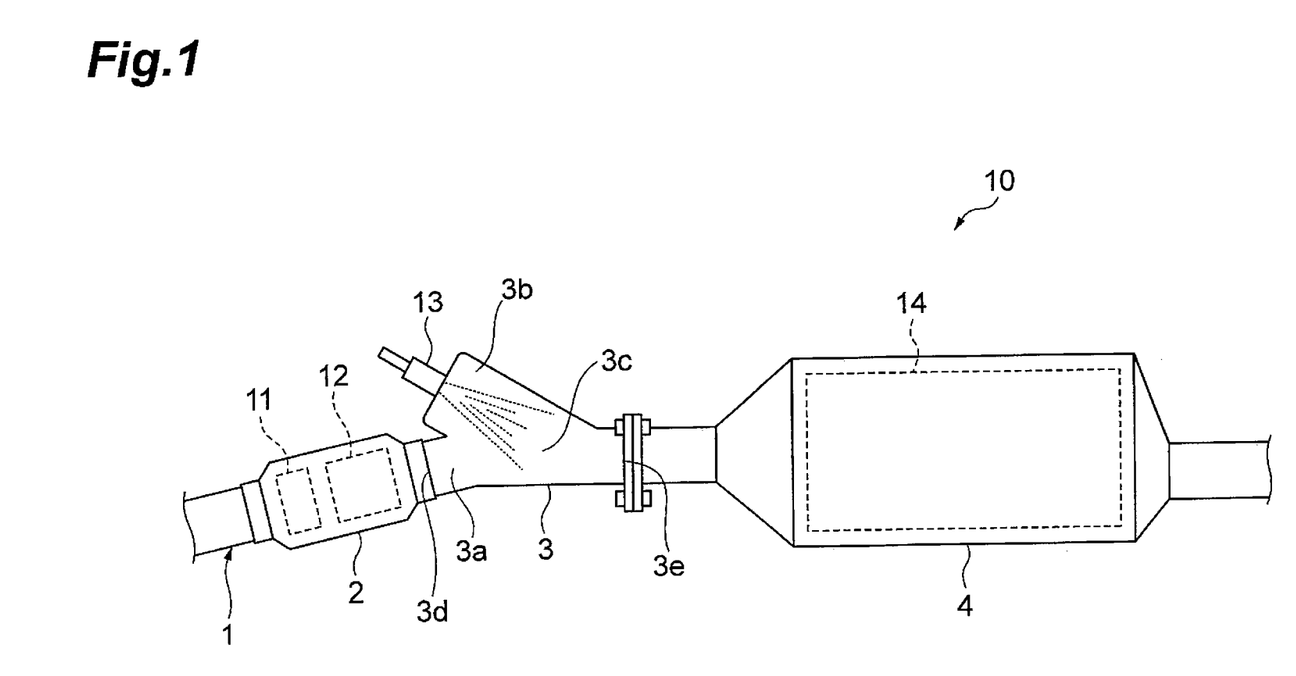
FIG. 1 is a diagram illustrating a schematic configuration of an exhaust purifier according to an embodiment of the present invention.

FIG. 1 is a diagram illustrating a schematic configuration of an exhaust purifier according to an embodiment of the present invention. As illustrated in FIG. 1, an exhaust purifier 10 of the present embodiment purifies, for example, exhaust gas exhausted from an engine, such as a diesel engine, in a vehicle, such as a truck (hereinafter, simply called "exhaust gas"). The exhaust purifier 10 is mounted in an exhaust gas flow passage 1 through which the exhaust gas flows, and includes a DOC 11, a DPF 12, an injector 13, and an SCR 14.

The exhaust gas flow passage 1 is defined at least by a first casing 2, a pipe 3, and a second casing 4, which are arranged in this order from the upstream side to the downstream side of the exhaust gas.

The first casing 2 is substantially cylindrically formed, and the DOC 11 and the DPF 12 are housed therein. The second casing 4 is substantially cylindrically formed, and the SCR 14 is housed therein.

The pipe 3 is formed into a shape in which a substantially cylindrical member is branched into a Y-shape, and the injector 13 is mounted on the branched portion.

The DOC 11 oxidizes unburned fuel in the exhaust gas, and is provided on the upstream side in the first casing 2.

The DPF 12 collects particulates in the exhaust gas that has passed through the DOC 11, and is provided on the downstream side of the DOC 11 in the first casing 2.

The injector 13 injects the reducing agent to add it to the exhaust gas immediately after passing through the DPF 12.

By injecting a urea aqueous solution as the reducing agent, the injector 13 here causes a thermal decomposition reaction and a hydrolysis reaction represented by the following formulae (1) to produce ammonia.

$$(NH_2)_2CO \rightarrow NH_3 + HNCO \text{ (thermal decomposition reaction)}$$

$$HNCO + H_2O \rightarrow NH_3 + CO_2 \text{ (hydrolysis reaction)} \quad (1)$$

The SCR 14 purifies the exhaust gas by causing a selective reduction reaction of NOx in the exhaust gas using the added reducing agent. Using the generated ammonia, the SCR 14 here causes the reduction reaction represented by the following formulae (2) to selectively reductively purify NOx. The subsequent stage of the second casing 4 is provided with an ammonia reducing catalyst (not illustrated) that oxidizes surplus ammonia.

$$4NO + 4NH_3 + O_2 \rightarrow 4N_2 + 6H_2O \text{ (standard)}$$

$$6NO_2 + 8NH_3 \rightarrow 7N_2 + 12H_2O \text{ (slow)}$$

$$NO + NO_2 + 2NH_3 \rightarrow 2N_2 + 3H_2O \text{ (fast)} \quad (2)$$

Figure 2:
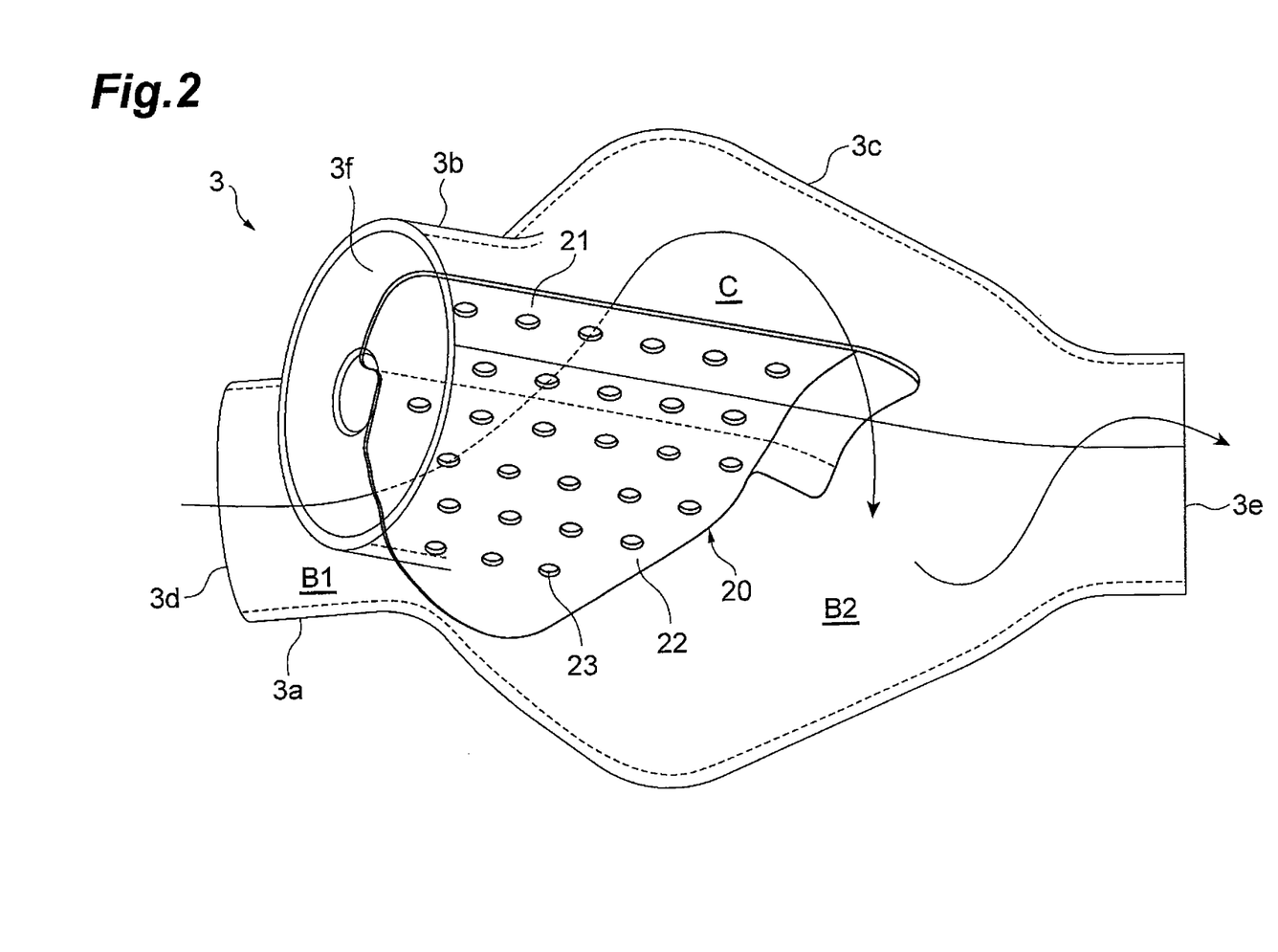
FIG. 2 is a transparent perspective view of a pipe as viewed from obliquely above.
Figure 3:
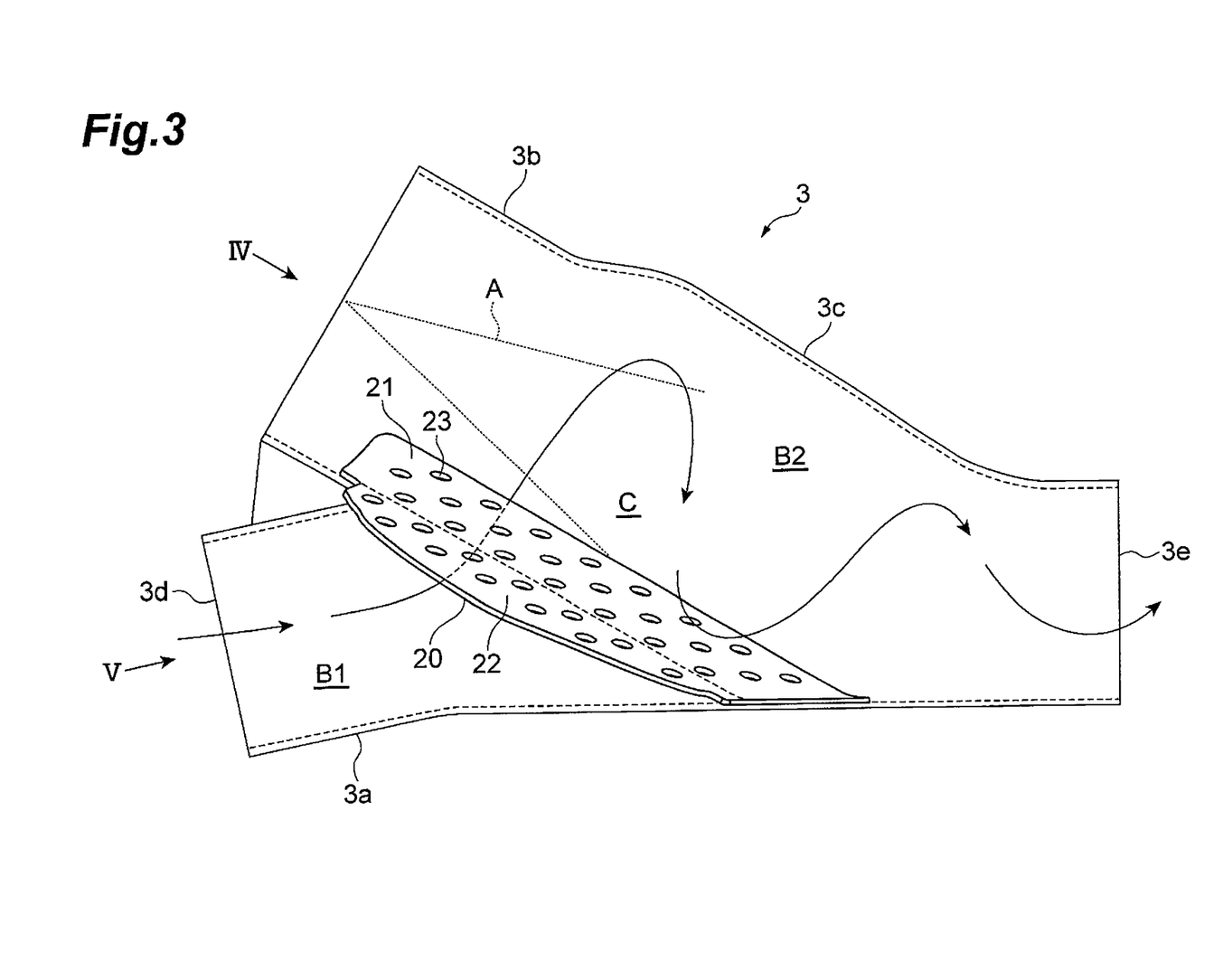
FIG. 3 is a transparent side view of the pipe as viewed from a side thereof.
Figure 4:
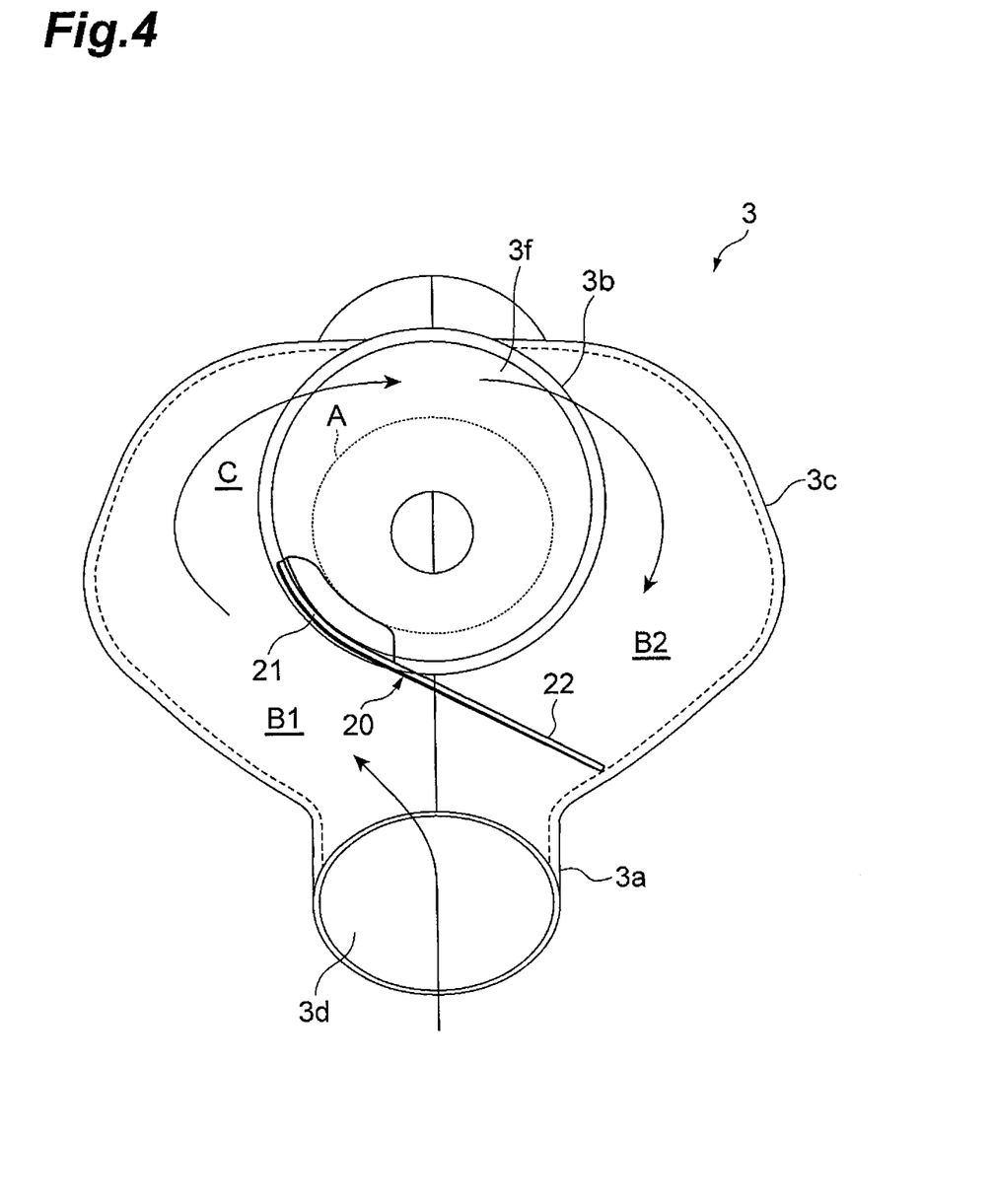
FIG. 4 is a transparent front view of the pipe as viewed from an arrow IV of FIG. 3.
Figure 5:
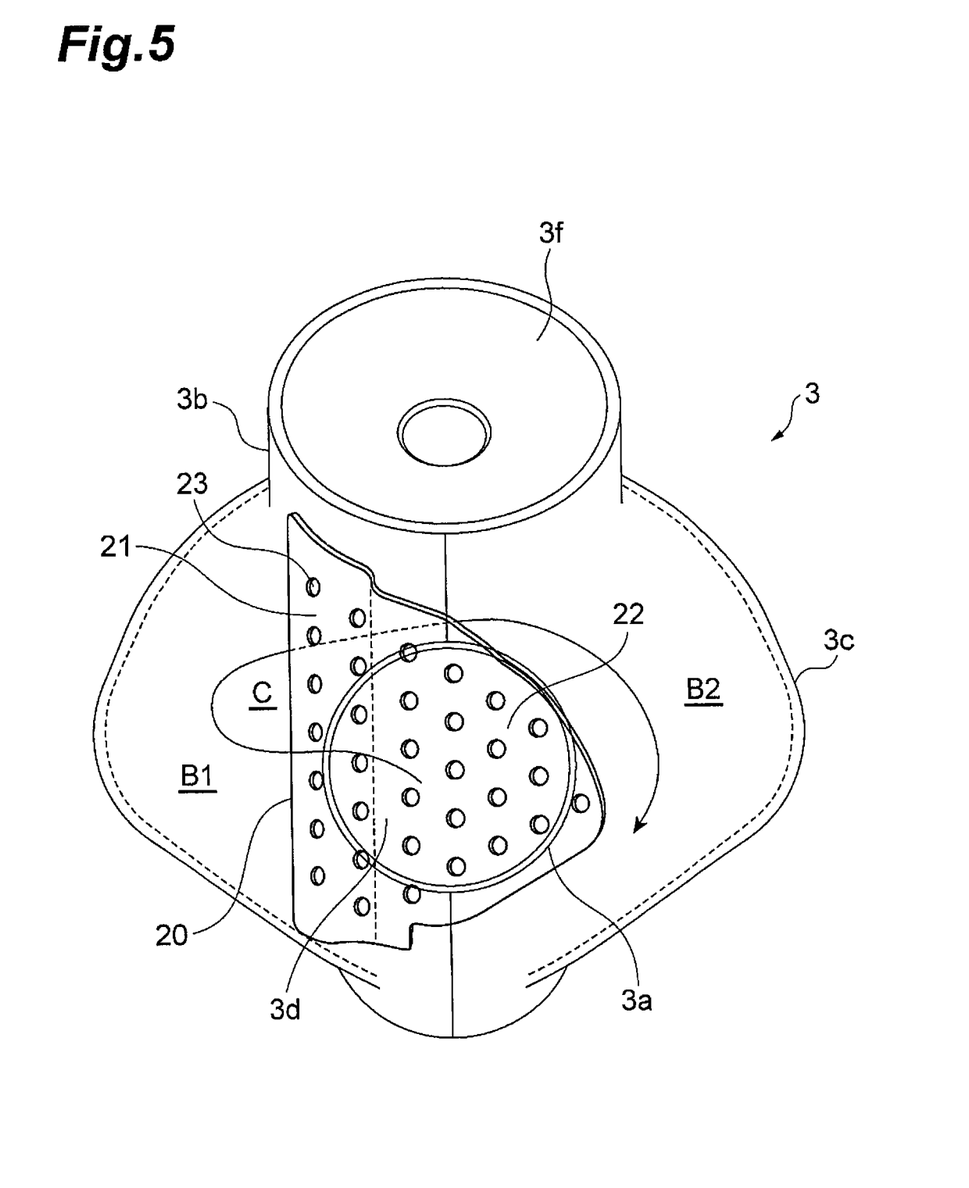
FIG. 5 is a transparent front view of the pipe as viewed from an arrow V of FIG. 3.

Next, the above-described pipe 3 of the exhaust purifier 10 will be described in detail using FIGS. 2 to 5. FIG. 2 is a transparent perspective view of the pipe as viewed from obliquely above. FIG. 3 is a transparent side view of the pipe as viewed from a side thereof. FIG. 4 is a transparent front view of the pipe as viewed from an arrow IV of FIG. 3. FIG. 5 is a transparent front view of the pipe as viewed from an arrow V of FIG. 3. For convenience, the upper side of FIG. 2 (the left side of each of FIGS. 4 and 5) will be called the left side, and the lower side of FIG. 2 (the right side of each of FIGS. 4 and 5) will be called the right side.

As illustrated in FIGS. 2 to 5, the pipe 3 includes a substantially linear main pipe portion 3a that is connected to the downstream side of the first casing 2 and the upstream side of the second casing 4, and includes a substantially linear branch pipe portion 3b that branches from the main pipe portion 3a. A bulging portion 3c having an enlarged diameter is formed at a central portion of the main pipe portion 3a, and the branch pipe portion 3b is branched from the bulging portion 3c. The diameter of the bulging portion 3c with the enlarged diameter gradually changes toward the downstream side of the exhaust gas, and reaches the normal diameter of the main pipe portion 3a.

The main pipe portion 3a constitutes an exhaust gas flow passage that feeds the exhaust gas having flowed from the first casing 2 into the second casing 4. An opening on the first casing 2 side of the main pipe portion 3a is called an upstream opening 3d, and an opening on the second casing 4 side of the main pipe portion 3a is called a downstream opening 3e.

The branch pipe portion 3b is connected to the main pipe portion 3a at the bulging portion 3c, and extends from the bulging portion 3c toward the side opposite to the downstream opening 3e so as to be inclined with respect to the main pipe portion 3a. The distal end of the branch pipe portion 3b is closed by a lid 3f, and the injector 13 is mounted on the lid 3f.

The injector 13 is mounted on the lid 3f so that the reducing agent is injected along the extending direction of the branch pipe portion 3b. As a result, the injector 13 injects the reducing agent in a direction inclined with respect to the axis line of the main pipe portion 3a. An injection area A of the reducing agent injected from the injector 13 is formed in a substantially cone shape that widens toward the main pipe portion 3a from the injector 13 as the apex. The injection area A can be geometrically obtained based on, for example, an injection angle of the reducing agent injected from the injector 13. In the present embodiment, the injection angle of the injector 13 is adjusted so that the maximum outside diameter of the injection area A is smaller than the inside diameter of the branch pipe portion 3b.

A guide member 20 that guides the exhaust gas flowing in the main pipe portion 3a is mounted in the bulging portion 3c of the pipe 3.

The guide member 20 is a member that is formed of a thin plate and guides the exhaust gas toward the left side of the injection area A by covering the exhaust gas upstream side of the injection area A of the reducing agent. The material of the guide member 20 is not limited, but is preferable to be a metal from the viewpoint of workability and durability, and among metals, SUS is particularly preferable because of being excellent in corrosion resistance.

To be specific, the guide member 20 is disposed on the exhaust gas upstream side of the injection area A in the bulging portion 3c, and partitions the pipe 3 into an upstream space B1 disposed on the upstream side of the exhaust gas and a downstream space B2 disposed on the downstream side of the exhaust gas. The guide member 20 extends in the extending direction of the branch pipe portion 3b, and includes a first guide portion 21 formed into a circular arc shape in the cross section along the inner circumferential surface of the branch pipe portion 3b and a second guide portion 22 extending from the right edge of the first guide portion 21 to the inner wall surface of the bulging portion 3c located on the right side of the injection area A.

The first guide portion 21 extends from the branch pipe portion 3b to the inner wall surface of the bulging portion 3c. Because the maximum outside diameter of the injection area A is smaller than the inside diameter of the branch pipe portion 3b as described above, the first guide portion 21 is shaped to cover the outside of the injection area A by disposing the first guide portion 21 in this manner. The left edge of the first guide portion 21 is spaced from the inner wall surface of the bulging portion 3c, and formed into a linear shape parallel to the extending direction of the branch pipe portion 3b. As a result, a vent C communicating the upstream space B1 with the downstream space B2 is formed on the left side of the first guide portion 21. Because the bulging portion 3c has the enlarged diameter, the vent C formed between the first guide portion 21 and the inner wall surface of the bulging portion 3c forms a large space.

An edge of the second guide portion 22 is made contact with the inner wall surface of the bulging portion 3c in the extending direction of the branch pipe portion 3b. As a result, the exhaust gas having flowed to the upstream space B1 cannot flow from the right side of the second guide portion 22 out to the downstream space B2. The shape of the second guide portion 22 is not limited, but can be formed into a flat plate shape or a curved plate shape. From the viewpoint of smoothly guiding the exhaust gas toward the vent C, the second guide portion 22 is preferable to be inclined toward the downstream side of the exhaust gas as the second guide portion 22 extends leftward (as the second guide portion 22 approaches the first guide portion 21).

A plurality of through-holes 23 are formed in the guide member 20 configured as described above. The through-holes 23 are holes for passing a part of the exhaust gas from the upstream space B1 to the downstream space B2. The through-holes 23 can be formed, for example, by punching the guide member 20. The number, sizes, positions, and the like of the through-holes 23 are not limited, but can be appropriately set.

The guide member 20 may be mounted in any of the main pipe portion 3a, the branch pipe portion 3b, and the bulging portion 3c.

In the exhaust purifier 10 configured as described above, as illustrated in FIG. 1, in the first casing 2, the exhaust gas from the engine is first oxidized by the DOC 11, and then, the particulates in the exhaust gas is collected by the DPF 12.

The exhaust gas that has passed through the DPF 12 flows into the pipe 3. In the pipe 3, as illustrated in FIGS. 2 to 5, the exhaust gas flows into the upstream space B1 from the upstream opening 3d. Then, while a part of the exhaust gas flows from the upstream space B1 into the downstream space B2 through the through-holes 23 formed in the guide member 20, most of the exhaust gas is guided by the guide member 20 toward the left side of the injection area A on the exhaust gas upstream side of the injection area A, and flows into the downstream space B2 from the vent C. At this time, the exhaust gas swirls clockwise as viewed in the direction of injection of the injector 13 by passing through the vent C because the guide member 20 covers the exhaust gas upstream side of the injection area A and the vent C is formed only on the left side of the injection area A.

The exhaust gas flows into the downstream space B2 while swirling in this manner, and as a result, a swirl flow of the exhaust gas occurs in the downstream space B2. The reducing agent injected from the injector 13 into the swirl flow of the exhaust gas is diffusionally added, and ammonia is produced by the thermal decomposition reaction and the hydrolysis reaction.

Thereafter, as illustrated in FIG. 1, the exhaust gas containing the ammonia is fed into the second casing 4, and NOx in the exhaust gas is selectively reduced by the SCR 14, so that the exhaust gas is purified. Then, the exhaust gas is fed to the ammonia reducing catalyst in the subsequent stage.

As described above, according to the present embodiment, the reducing agent can be mixed into the exhaust gas flowing through the pipe 3 by injecting the reducing agent from the injector 13. At this time, the guide member 20 guides the exhaust gas toward the left side of the injection area A by covering the exhaust gas upstream side of the injection area A, so that the exhaust gas is inhibited from directly entering the injection area A of the reducing agent, and the swirl flow surrounding the injection area A of the reducing agent can be generated. As a result, it is possible to diffuse the reducing agent injected from the injector 13 in the exhaust gas while inhibiting the reducing agent injected from the injector 13 from adhering to the inner wall surface of the pipe 3 due to wind pressure of the exhaust gas, so that the diffusion of the reducing agent can be sufficiently performed.

When the through-holes 23 are formed in the guide member 20, most of the exhaust gas flows downstream while wrapping around the injection area A, whereas a part of the exhaust gas flows downstream through the through-holes 23 of the guide member 20. Hence, the flow of the exhaust gas can be adjusted by changing the number, sizes, positions, and other properties of the through-holes 23 formed in the guide member 20, so that it is possible to adjust the swirl speed of the exhaust gas while generating a good swirl flow of the exhaust gas. Moreover, the pressure loss of the exhaust gas can be reduced, so that a good exhaust pipe can be obtained.

A structure to inject the reducing agent in the direction inclined with respect to the axis line of the pipe 3 can increase the distance from the injector 13 to the inner wall surface of the pipe 3, so that it is possible to diffuse the reducing agent in the exhaust gas while inhibiting the reducing agent from adhering to the inner wall surface of the pipe 3.

While the preferred embodiment of one aspect of the present invention has been described above, the present invention is not limited to the above-described embodiment, and may be modified within the scope not changing the gist described in the claims, or may be applied to other embodiments.

In the above-described embodiment, the specific arrangement and the shape of the guide member are specified. The arrangement and the shape of the guide member are, however, not limited provided that the guide member can guide the exhaust gas toward one side of the injection area by covering the exhaust gas upstream side of the injection area into which the reducing agent is injected.

For example, the first guide portion 21 of the above-described embodiment covers the exhaust gas upstream side of the injection area A by having the circular arc shape in the cross section along the inner circumferential surface of the branch pipe portion 3b and having the same section in the extending direction of the branch pipe portion 3b. The first guide portion may be formed into a circular arc shape in the cross section sharing the same center axis with the injection area A, or may be formed into a circular arc shape in the cross section corresponding to the outer shape of the cone-shaped injection area A. If the first guide portion is formed into a circular arc shape in the cross section corresponding to the outer shape of the cone-shaped injection area A, the first guide portion has a shape that is reduced in diameter as it extends toward the upstream side of the reducing agent injected from the injector 13 and is enlarged in diameter as it extends toward the downstream side of the reducing agent injected from the injector 13. In these cases, the second guide portion has a shape that extends from the first guide portion in a direction departing from the injection area A so that the guide member does not enter the injection area A. When the guide member is formed in this manner, the swirl flow of the exhaust gas can flow along the injection area A, so that the diffusion of the reducing agent can be further facilitated.

In the above-described embodiment, the description has been made such that the through-holes are formed in the guide member. The through-holes, however, need not be necessarily formed in the guide member.

In the above-described embodiment, the truck is exemplified as the vehicle. The example may, however, be a bus, a tractor, or another vehicle. In the above description, the term "substantially" is intended to allow errors in design and manufacturing.

REFERENCE SIGNS LIST

1 Exhaust gas flow passage, 2 First casing, 3 Pipe, 3a Main pipe portion, 3b Branch pipe portion, 3c Bulging portion, 3d Upstream opening, 3e Downstream opening, 3f Lid, 4 Second casing, 10 Exhaust purifier, 13 Injector, 20 Guide member, 21 First guide portion, 22 Second guide portion, 23 Through-holes, A Injection area, B1 Upstream space, B2 Downstream space, C Vent.

The invention claimed is:

1. An exhaust purifier for purifying exhaust gas of an engine, the exhaust purifier comprising:
   a pipe through which exhaust gas flows, the pipe including an injection area into which a reducing agent is injected, the exhaust gas entering the pipe substantially along an axis line of the pipe;
   an injector that injects a reducing agent into the pipe; and
   a guide member that guides the exhaust gas flowing through the pipe, the guide member comprising:

a first guide portion that is formed into a circular arc shape in the cross section sharing a center axis with the injection area; and a second guide portion that extends from the first guide portion in a direction departing from the injection area, wherein the guide member guides the exhaust gas toward one side of the injection area by covering an exhaust gas upstream side of the injection area, and wherein the circular arc shape of the first guide portion extends less than 90 degrees around the center axis.

2. The exhaust purifier according to claim 1, wherein one or a plurality of through-holes are formed in the first guide portion and the second guide portion.

3. The exhaust purifier according to claim 1, wherein the injector injects the reducing agent in a direction inclined with respect to the axis line of the pipe.

4. The exhaust purifier according to claim 1, wherein the guide member guides a majority of the exhaust gas toward one lateral side of the injection area by covering the exhaust gas upstream side of the injection area.

5. The exhaust purifier according to claim 1, the pipe further including a bulging portion and a downstream opening toward which the bulging portion tapers, the guide member disposed inside the bulging portion.

* * * * *